United States Patent Office 3,580,919
Patented May 25, 1971

3,580,919
PROCESS FOR PREPARATION OF NAPH-
THYRIDINE DIONE DYESTUFFS
Walter R. Demler, Hamburg, and Arthur F. Jachlewski,
Buffalo, N.Y., assignors to Allied Chemical Corporation, New York, N.Y.
No Drawing. Filed Apr. 30, 1968, Ser. No. 725,481
Int. Cl. C07d 31/44
U.S. Cl. 260—295                                18 Claims

ABSTRACT OF THE DISCLOSURE

An improved process for preparing water-insoluble dyes of the naphthyridine dione series by reaction of an indigo with an aryl acetyl halide in the presence of an inorganic acid halide preferably a thionyl halide and an aroyl halide, said indigo, aryl acetyl halide and aroyl halide being free of water-solubilizing substituents. The improved process provides yields of naphthyridine dione dyestuffs which are as much as 60–110% greater than those realized by previously employed processes using an indigo and an aryl acetyl halide as starting materials while at the same time requiring as little as 30–75% of the costly aryl acetyl halide reactant.

---

The present invention relates to an improved process of preparing water-insoluble dyestuffs and more particularly to an improvement in preparing water-insoluble dyes of the naphthyridine dione series from indigo and aryl acetyl halide starting materials.

Heretofore, water-insoluble dyes of the naphthyridine dione series, a known class of water-insoluble dyestuffs, were prepared by heating the corresponding indigo with at least four molar proportions per mol of the indigo of the corresponding aryl acetyl halide, as disclosed, for example, in U.S. Patent 1,043,682. Such procedure not only entails use of costly excesses of aryl acetyl halide, i.e. use of more than twice the stoichiometric proportion of aryl acetyl halide required to form the dyestuff, but also requires relatively high reaction temperatures, for example, at least about 180° C. and higher. Moreover, the yields of the naphthyridine dione dyestuffs obtained by the prior art process are poor amounting to, at most, only about 20–25% of the theoretical yields, based on the indigo charged.

Accordingly, it is an object of the present invention to provide an improved process of preparing water-insoluble naphthyridine dione dyestuffs from reaction of an indigo with an aryl acetyl halide, said reactants being free of water-solubilizing substituents. This and other objects and advantages will be apparent from the following description of the present invention.

It has now been found that the aforementioned disadvantages of the prior art process are overcome and improved yields of the naphthyridine dione dyestuffs, free of water-solubilizing substituents, are obtained by reaction of an indigo with an aryl acetyl halide in the presence of an inorganic acid halide and an aroyl halide, said indigo, aryl acetyl halide and aroyl halide being free of water-solubilizing substituents. As indicated above, the naphthyridine dione dyestuffs porduced in accordance with the present invention are a known class of water-insoluble dyestuffs and correspond to the structural formula:

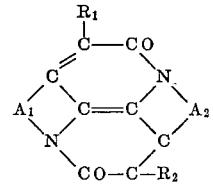

wherein $A_1$ and $A_2$ represent arylene radicals free of water-solubilizing substituents and $R_1$ and $R_2$ represent an aryl radical free of water-solubilizing substituents. The aryl radicals represented by $A_1$, $A_2$, $R_1$ and $R_2$ in the above formula generally may have one to three benzene rings, such as phenyl, indanyl, naphthyl, biphenylyl, anthryl, phenanthryl, and substituted derivatives thereof, including halo-, alkyl-, alkoxy-, haloalkyl-, nitro-, carbalkoxy-, alkanoyl- and thioalkyl-. The alkyl-, alkoxy-, thioalkyl-, haloalkyl-, alkanoyl-, and carbalkoxy- substituents herein contemplated may contain from 1–4 carbon atoms. Specific examples of $A_1$, $A_2$, $R_1$ and $R_2$ include phenyl, 2-chlorophenyl,
4-fluorophenyl, 2-fluoorphenyl,
3,4-dichlorophenyl, 2,4,6-trichlorophenyl,
2-bromophenyl, 2-chloro-5-trifluoromethylphenyl,
4-chlorophenyl, 4-bromophenyl,
2-chloro-4-fluorophenyl, 2-methylphenyl,
4-methylphenyl, 2-methyl-4-ethylphenyl,
3-chloro-4-methylphenyl, 2-trichloromethylphenyl,
2,4-dimethylphenyl, 2,4,6-trimethylphenyl,
2-dichlorofluoromethylphenyl, 2-trifluoromethylphenyl,
2-methoxyphenyl, 4-methoxyphenyl,
2,4-dimethoxyphenyl, 2-methoxy-4-chlorophenyl,
2-methoxy-4-ethoxyphenyl-2thiomethylphenyl,
4-thiomethylphenyl, 3-thiomethylphenyl,
2-chloro-4-thiomethylphenyl, 2-nitrophenyl,
4-nitrophenyl, 2-acetoxyphenyl,
2-carbethoxyphenyl, 2-carbomethoxyphenyl,
2,4-dicarbethoxyphenyl, 4-phenylphenyl,
4-(4-chlorophenyl)phenyl, 4-(4-methoxyphenyl)phenyl,
4-(4-methylphenyl)phenyl, 4-phenoxyphenyl,
naphthyl, 4-chloronaphthyl,
4-fluoronaphthyl, 2-methoxynaphthyl,
4-thiomethylnaphthyl, 2-methylnaphthyl
and 2-chloronaphthyl.

The process of the present invention may be effected at atmospheric pressure or, if desired, at superatmospheric pressure. In addition, if desired, the process of the invention may be effected in the presence of a high boiling inert diluent, e.g. an organic liquid having a normal boiling point above about 135° C. Suitable diluents for such purpose include substituted or unsubstituted aromatic compounds including halobenzenes, such as o- or m-dichlorobenzene, 1,2,4-trichlorobenzene; nitro aromatic compounds, such as nitrobenzene; and like high boiling organic liquids.

In carrying out the improved process of the present invention, the indigo, aryl acetyl halide and inorganic acid halide reactants advantageously are heated at an elevated temperature below about 135° C., illustratively, between about 85–115° C. with agitation. Heating such mixture at temperatures in excess of about 115° C. generally provides no additional advantage, may result in loss of inorganic acid halide, and hence, is less desirable. Heating of the above mixture normally is effected until evolution of hydrogen halide resulting from the reaction of the indigo with the aryl acetyl halide in the presence of the inorganic acid halide substantially ceases, generally for about two to about 85–115° C., with agitation. Heating such mixture longer than about 30 hours, while effective produces no additional advantages.

The reaction mixture obtained from the afore-described heating step is then further heated in the presence of an aroyl halide at a temperature of at least about 135° C., preferably at a temperature between about 150–170° C., in order to obtain improved yields of the naphthyridine dione dyestuffs according to the invention. Although temperatures of about 250° C. or higher may be employed, no additional advantages are realized by use of such elevated temperature. In general, the inorganic acid halide-treated mixture is heated in the presence of the aroyl halide until hydrogen halide evolution from the reaction mixture ceases, i.e. from about 30 minutes up to about two hours. Preferably, the heating is continued for from 2–4 hours or longer after evolution of gas ceases.

The desired naphthyridine dione dyestuff is recovered from the reaction mixture by conventional methods, e.g. filtration, decantation and the like, generally after the reaction mixture is permitted to become cooled to ambient temperatures. Yields of about 40% or more of theory, based on the indigo charged, of the desired dyestuff are characteristically obtained in accordance with the process of the present invention.

It will be appreciated that various obvious modifications may be adopted in effecting the process of the present invention. Accordingly, the aryl acetyl halide may be conveniently generated in the reaction diluent by heating equimolar proportions of the corresponding aryl acetic acid and an inorganic acid halide, which reaction mixture may be charged to the reaction of the invention without recovery or purification. In addition, according to another embodiment of the invention, the aroyl halide, prior to heating of the indigo, aryl acetyl halide, inorganic acid halide mixture, may be charged to such mixture which is subsequently heated to at least about 135° C. advantageously in a gradual manner.

It was highly surprising to discover according to the invention that in the presence of an inorganic acid halide, the mixture of the indigo and aryl acetyl halide undergoes reaction evolving hydrogen halide at temperatures as low as ca. 85° C. whereas in the absence of the inorganic acid halide, the aryl acetyl halide and the indigo do not react even when heated at 100° C. for 10 hours (J. Van Alpren, Rec. Trav. Chim. 58, 378, (1939)). It was also surprising to obtain improved yields of the desired dyestuff according to the above mentioned embodiment of the invention wherein the aryl acetyl halide, the indigo and inorganic acid halide are heated with aroyl halide since it is known that heating indigo with an aroyl halide produces a complex halogen-containing compound, e.g. the structure of Formula IV of H. de Diesbach et al. Helv. Chim. Acta 23, 469 (1940); see also D. R. P. An meldung F32053, Frdl. 10,404.

In the present process the amount of inorganic acid halide charged is critical. Hence, at least about 0.5 but not more than about 3 molar proportions of the halide per mol of the indigo are charged to give improved yields of the naphthyridine dione dyestuff according to the invention. Preferably, about 0.7 to 2.7 mols and especially about 1.0 to 2.5 mols of inorganic acid halide per mol of the indigo are employed. At least about 1.5 mols and preferably about 2.0 to 13 mols of aroyl halide per mol of the indigo are employed in accordance with the improved process of the invention. Use of 15 or more mols of aroyl halide per mol of indigo, while effective, provides no additional advantage. The amount of aryl acetyl halide charged according to the invention is at least 2 molar proportions and preferably about 2 to 3 molar proportions per mol of the indigo. An especially good result is obtained employing about 2.1 to 2.5 mols of the aryl acetyl halide per mol of the indigo. Use of 4 or more molar proportions of the aryl acetyl halide per mol of the indigo, as employed in the prior art preparation of the naphthyridine dione dyestuffs, while effective in the present process is unnecessary and wasteful of the reagent.

Indigo compounds which are useful in preparing naphthyridine dione dyestuffs according to the invention include indigo and indigo substituted with groups free of active hydrogen, i.e. groups which do not impart solubility in water, for example, carboxyl, hydroxyl and sulfonic acid groups. Illustrative substituted indigo compounds employable herein include halo-, alkyl-, alkoxy-, thioalkyl-, haloalkyl-, nitro-, carbalkoxy- and alkanoyl- derivatives thereof. Typical examples of useful indigos include:

5,5' difluoroindigo
5,5' dichloroindigo
indigo
chloroindigo
5,7,5',7' tetrabromoindigo
hexachloroindigo
5,5' dimethylindigo
5,5' dimethoxyindigo
α-naphthal indigo
β-naphthal indigo
5,5' dichloro-7,7'-dibromoindigo Preferably, indigo compounds in which the fused arylene residues of the indoline nuclei are of the benzene series, i.e. indigo compounds corresponding to the above structural formula of the indigo wherein $A_1$ and $A_2$ represent aryl radicals of the benzene series, are employed.

Any aryl acetyl halide in which the carbon atom attached to the carbonyl group is substituted with two hydrogen atoms and which is devoid of water solubilizing substituents can be employed in the present process. Substituted aryl acetyl halides in general will bear substituents corresponding to the substituents disclosed with respect to the substituted indigo compounds, above described.

Representative examples of suitable aryl acetyl halides include:

p-fluorophenyl acetyl chloride
α-naphthyl acetyl chloride
β-naphthyl acetyl chloride
p-anisyl acetyl chloride
o-chlorophenyl acetyl chloride
2,4-dichlorophenyl acetyl chloride
pyrenyl acetyl chloride
m-nitrophenyl acetyl chloride
p-tolyl acetyl chloride
phenyl acetyl chloride
phenyl acetyl bromide
phenyl acetyl fluoride
phenyl acetyl iodide Preferably, we employ an aryl acetyl chloride in which the aryl group is of the benzene series. Phenyl acetyl chlorides provide an especially good result.

Any inorganic acid halide can be employed in the improved process of the invention, for example, thionyl chloride, thionyl bromide, thionyl fluoride, phosphorus pentachloride, phosphorus trichloride and phosphorus oxychloride. Preferably thionyl halides and especially the readily available thionyl chloride is employed.

Aroyl halides which can be employed in the present invention are free of water solubilizing substituents. Substituted aroyl halides in general will bear substituents corresponding to the substituents disclosed with respect to the substituted indigo compounds, above described.

Representative examples of suitable aroyl halides include:

benzoyl chloride
benzoyl bromide
α-naphthoyl chloride
β-naphthoyl chloride
phthaloyl chloride
p-toluyl chloride
o-fluorobenzoyl chloride
m-nitrobenzoyl chloride
p-nitrobenzoyl chloride
o-chlorobenzoyl chloride Benzoyl chloride which provides an especially good result is preferred.

The present invention provides yields of naphthyridine dione dyestuffs which are as much as about 60–110% greater than those of the prior art process involving reaction of an indigo and aryl acetyl halide in forming these dyestuffs. The present process, moreover, neither requires the extreme reaction temperatures of the corresponding prior art procedure nor entails isolation of a reactive intermediate. In general, the present process can be carried out using as little as 30 to 75% of the costly aryl acetyl halide reactant as compared with the prior art procedure for preparing naphthyridine dione dyestuffs by reaction of an indigo and aryl acetyl halide.

The following examples, wherein parts, percentages and proportions unless otherwise noted are by weight and temperatures are in degrees centigrade, are illustrative of the process of this invention.

EXAMPLE 1

To an agitated suspension of 32.5 parts (0.124 mol) of dry pulverulent indigo in 175 parts by volume of o-dichlorobenzene ("Solvent 74" containing a small amount of p-dichlorobenzene) in a reaction vessel equipped with a condenser cooled by water at ambient temperature, 42.2 parts (0.273 mol, corresponding to 2.2 mol per mol of indigo) of phenylacetyl chloride and 20.3 parts (0.171 mol, corresponding to 1.38 mol per mol of indigo) of thionyl chloride are charged. The mixture is heated over a period of 90 minutes to 100° and maintained at 100–105° for about 16 hours. During heating, sulfur dioxide and hydrogen chloride are evolved from the reaction mixture. To the resultant mass, there are charged 53.3 parts (0.38 mol, corresponding to 3.06 mol per mol of indigo) of benzoyl chloride. Over a period of about 2 hours the mixture is heated from 105 to 150°, maintained at the latter temperature for four hours during which hydrogen chloride gas is evolved from the reaction mixture, cooled to ambient temperature and filtered. The solid recovered is washed with four 25 part by volume portions of o-dichlorobenzene and four 19.7 part portions of ethyl alcohol, and dried at about 70°. There are thus obtained 22.8 parts (39.8% of theory based on indigo charged) of the red dyestuffs 7,14-dhphenyl, diindolo [3,2,1-de: 3′,3′,1′-ij] [1,5] naphthyridine - 6,13-dione (Color Index No. 73095) corresponding to the structural formula

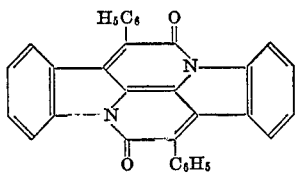

EXAMPLE 2

The procedure of Example 1 is repeated substantially as described except that 1,2,4-trichlorobenzene is charged in place of the o-dichlorobenzene; the addition of thionyl chloride is omitted; 35.2 parts (0.25 mol, corresponding to 2.02 mols per mol of indigo) of benzoyl chloride are charged; the benzoyl chloride-containing mixture is heated at 170° for four hours instead of at 150°; and the product is washed with 1,2,4 - trichlorobenzene instead of o-dichlorobenzene. There are obtained only 15.5 parts (26.8% yield based on indigo) of 7,14-diphenyl diindolo [3,2,1-de: 3′,2′,1′-ij] [1,5]-naphthyridine-6.13-dione.

The foregoing example illustrates the relatively poor yield of the desired dyestuff obtained by omitting the thionyl halide.

EXAMPLE 3

The procedure of Example 1 is repeated substantially as described employing nitrobenzene as reaction diluent in place of the o-dichlorobenzene. The resultant yield of the naphthyridine dione dyestuffs is 23.6 parts (40.8% yield of theory based on the indigo charged).

EXAMPLE 4

In a reaction vessel similar to that of Example 1, an agitated mixture of 36.7 parts of phenyl acetic acid (0.269 mol), 175 parts by volume of 1,2,4-trichlorobenzene and 56.1 parts of thionyl chloride (0.472 mol) is heated to 80° over a period of about 30 minutes and then heated from 80 to 120° over a period of one hour to form phenyl acetyl chloride. The resultant mixture is cooled to ambient temperature. Indigo (32.5 parts, 0.124 mol) is charged to the mixture which contains about 41.6 parts (0.269 mol, corresponding to about 2.17 mols per mol of indigo) of phenyl acetyl chloride and about 24.2 parts (0.203 mol, corresponding to about 1.638 mols per mol of indigo) of thionyl chloride. The mixture is heated at 100–105° for 18 hours and then, following addition of 35.2 parts of benzoyl chloride, at 170° for about four hours. The yield of the naphthyridine dione dyestuff which is recovered substantially as described in Example 1 above is 22.5 parts (39% yield of theory based on the indigo charged).

EXAMPLE 5

The procedure of Example 4 is repeated substantially as described except that o-dichlorobenzene is employed as reaction diluent in place of the 1,2,4-trichlorobenzene; the mixture of phenyl acetyl chloride, indigo, thionyl chloride and diluent is heated at 113° for 9 hours; and the resultant reaction mixture is heated with 53.4 parts benzoyl chloride at 150° according to the procedure of Example 1. The yield of naphthyridine dyestuff recovered in accordance with the procedure of Example 1 is 21.1 parts (36.6% of theory based on the indigo charged).

EXAMPLE 6

The procedure of Example 4 is repeated substantially as described except that o-dichlorobenzene is employed as the reaction diluent in place of 1,2,4-trichlorobenzene; the mixture of phenyl acetyl chloride, thionyl chloride, indigo and diluent is heated for 16 hours at 100–105°; and the resultant mixture is heated with 67 parts (0.383 mol, corresponding to 3.09 mol per mol of indigo) of o-chlorobenzoyl chloride at 150° according to the procedure ot Example 1. The yield of the naphthyridine dione dyestuff which is recovered as described in Example 1 is 23.5 parts (40.7% of theory based on indigo charged).

EXAMPLE 7

The procedure of Example 6 is repeated substantially as described except that the mixture of phenyl acetyl chloride, thionyl chloride, indigo and o-dichlorobenzene is heated for about 19 hours at 100 to 103°; the resultant mixture is treated with 67 parts of p-chlorobenzoyl chloride in place of o-chlorobenzoyl chloride; and, prior to drying, the product is washed free of p-chlorobenzoic acid with aqueous sodium hydroxide. The yield of the naphthyridine dione dyestuff is 22.7 parts (39.2% of theory based on the amount of indigo charged).

EXAMPLE 8

The procedure of Example 6 is repeated substantially as described except that 50 parts (0.267 mol, corresponding to 2.15 mols per mol of indigo) of p-nitrobenzoyl chloride is charged in place of benzoyl chloride. There is recovered 25.1 parts (43.4% of theory based on the indigo charged) of the naphthyridine dione dyestuff.

EXAMPLE 9

The procedure of Example 5 is repeated except that the benzoyl chloride is charged with the indigo and the resultant mixture is heated at 100–105° for 16 hours and then at 150° for 4 hours. The yield of the naphthyridine dione dyestuff is 21.4 parts (37% of theory based on the indigo charged).

The following example illustrates that use of an aliphatic acyl halide in place of the aroyl halide prescribed by the invention results in a poor yield of the desired naphthyridine dione dyestuff.

EXAMPLE 10

The procedure of Example 6 is repeated substantially as described except that 30.9 parts (0.394 mol, corresponding to 3.18 mol per mol of indigo) of acetyl chloride is charged in place of the o-chlorobenzoyl chloride, the resultant mixture being heated over a period of about 12 hours to 150° and maintained at the latter temperature for 12 hours. The yield of the 7,14-diphenyl, diindolo-[3,2,1-de:3',2',1'-ij] [1,5] naphthyridine 6,13-dione is only 6.2 parts (10.7% of theory based on the indigo charged).

The following example illustrates preparation of a naphthyridine dione dyestuff in accordance with the process of the present invention whereby all of the reactants are brought together initially in the presence of any added inert reaction diluent.

EXAMPLE 11

The procedure of Example 1 is repeated substantially as described except that the benzoyl chloride (212 parts, 1.51 mol, corresponding to about 12.7 mol per mol of indigo) is charged in place of o-dichlorobenzene diluent. The resultant product is washed free of excess benzoyl chloride with o-dichlorobenzene and washed free of the dichlorobenzene with ethyl alcohol. After drying the yield of the naphthyridine dione dyestuff is 22.9 parts (39.6% of theory based on the indigo charged).

EXAMPLE 12

In accordance with U.S. Pat. 1,043,682, an agitated mixture of 65 parts (0.248 mol) of indigo, 152 parts (0.984 mol, corresponding to about four mols per mol of indigo) of phenyl acetyl chloride and 250 parts by volume of 1,2,4-trichlorobenzene is refluxed at about 215° for 10 hours. The mixture is cooled to ambient temperature over a period of 16 hours and filtered. The recovered filter cake is washed with 50 parts by volume of 1,2,4-trichlorobenzene, 50 parts by volume of ethyl alcohol and then with 600 parts of water at about 55°. After being dried at 65–70°, the naphthyridine dione dyestuff of Example 1 is obtained in a yield of only 27.1 parts (33.4% of theory based on the indigo charged).

EXAMPLE 13

In a reaction vessel similar to that of Example 1 an agitated mixture of 36.7 parts of phenyl acetic acid (0.269 mol), 175 parts by volume of nitrobenzene, 32.5 parts of indigo (0.124 mol), 48 parts of thionyl chloride (0.403 mol) and 52.8 parts of benzoyl chloride (0.375 mol) is heated at a steady rate to about 100–103° over a period of 1.5 hours and then to 150° over a period of 4 hours. The mixture is agitated at 148–152° for about four hours, and then allowed to cool to ambient temperature. The solid product which is recovered by filtration of the reaction mass is washed with 150 parts by volume of nitrobenzene and then washed free of nitrobenzene with 95% aqueous alcohol. The yield of 7,14-diphenyl diindolo(3,2,1-de:3',2',1'-ij) (1,5)naphthyridine-6,13-dione is 23 parts (39.8% of theory based on indigo).

As indicated above, naphthyridine dione compounds produced by the process of the present invention are a known class of water-insoluble dyestuffs. These dyestuffs exhibit high thermal stability and are useful for pigmenting plastics, e.g. viscose, cellulose ester, superpolyamide, polystyrene and the like, in the molten state at elevated temperature by known procedures.

We claim:
1. In the process for the preparation of a water-insoluble dye of the naphthyridine dione series having the structural formula

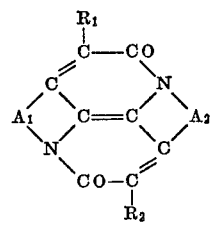

wherein
   $A_1$ and $A_2$ represent arylene radicals having from one to three benzene rings,
   $R_1$ and $R_2$ represent aryl radicals having from one to three benzene rings, said $A_1$, $A_2$, $R_1$ and $R_2$ radicals containing substituents selected from hydrogen, halogen, alkyl of from one to four carbon atoms, alkoxy of from one to four carbon atoms, haloalkyl of from one to four carbon atoms, carbalkoxy of from one to four carbon atoms, alkanoyl of from one to four carbon atoms, and thioalkyl of from one to four carbon atoms, by condensing an indigo having the structural formula

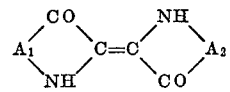

wherein $A_1$ and $A_2$ have the aforementioned meanings, with aryl acetyl halide wherein the aryl group is selected from radicals $R_1$ and $R_2$ of the aforementioned meanings, the improvement which comprises
   (1) heating the indigo and aryl acetyl halide at a temperature below about 135° C. in the presence of at least about 0.5 mol of an inorganic acid halide, per mol of said indigo, and thereafter
   (2) heating the reaction mixture of step (1) in the presence of an aroyl halide selected from benzoyl halides, halobenzoyl halides, toluyl halides, nitrobenzoyl halides, phthaloyl halides, α-naphthoyl halides and β-naphthoyl halides at a temperature of at least about 135° C.

2. The process as defined in claim 1 wherein the inorganic acid halide is a thionyl halide.

3. The process as defined in claim 1 wherein the reaction is conducted in the presence of diluent.

4. The process as defined in claim 1 wherein $A_1$ and $A_2$ represent phenyl radicals, $R_1$ and $R_2$ represent phenyl radicals and the aroyl halide is a benzoyl halide.

5. The process as defined in claim 2 wherein said reaction comprises the steps of:
   (1) heating said indigo and aryl acetyl halide with at least about 0.5 mol of a thionyl halide per mol of the indigo at a temperature of at least about 85° C. and thereafter
   (2) heating the reaction mixture of step (1) at a temperature of at least about 135° C. but below about 250° C. with at least about 1.5 mols of aroyl halide per mol of the indigo.

6. The process as defined in claim 5 wherein steps (1) and (2) are conducted in the presence of a diluent.

7. The process as defined in claim 6 wherein $A_1$ and $A_2$ represent phenylene radicals, $R_1$ and $R_2$ represent phenyl radicals and the aroyl halide is a benzoyl halide.

8. The process as defined in claim 7 wherein the thionyl halide is charged in an amount not exceeding 3 molar proportions per mol of the indigo.

9. The process as defined in claim 7 wherein the thionyl halide is thionyl chloride, said thionyl chloride being present in an amount between about 1.0 to 2.5 mols per mol of indigo.

10. The process as defined in claim 7 wherein the inert diluent in an organic liquid having a normal boiling point of at least about 135° C.

11. The process as defined in claim 2 wherein $A_1$, $A_2$, $R_1$ and $R_2$ are substituted with hydrogen atoms.

12. The process as defined in claim 2 wherein $A_1$, $A_2$, $R_1$ and $R_2$ contain alkyl substituents of from one to four carbon atoms.

13. The process as defined in claim 2 wherein $A_1$, $A_2$, $R_1$ and $R_2$ contain alkoxy substituents of from one to four carbon atoms.

14. The process as defined in claim 2 wherein $A_1$, $A_2$, $R_1$ and $R_2$ contain haloalkyl substituents of from one to four carbon atoms.

15. The process as defined in claim 2 wherein $A_1$, $A_2$, $R_1$ and $R_2$ contain nitro substituents.

16. The process as defined in claim 2 wherein $A_1$, $A_2$, $R_1$ and $R_2$ contain carbalkoxy substituents of from one to four carbon atoms.

17. The process as defined in claim 2 wherein $A_1$, $A_2$, $R_1$ and $R_2$ contain alkanoyl substituents of from one to four carbon atoms.

18. The process as defined in claim 2 wherein $A_1$, $A_2$, $R_1$ and $R_2$ contain thioalkyl substituents of from one to four carbon atoms.

References Cited

UNITED STATES PATENTS 1,043,682  11/1912  Engi _____ 260—295

OTHER REFERENCES

The Merck Index, Seventh Edition, pp. 1039, 1960 (RS 356-M524).

ALAN L. ROTMAN, Primary Examiner

U.S. Cl. X.R.

260—41; 106—64, 176

PO-1050
(5/69)

UNITED STATES PATENT OFFICE
CERTIFICATE OF CORRECTION

Patent No. 3,580,919          Dated May 25, 1971

Inventor(s) Walter R. Demler and Arthur F. Jachlewski

It is certified that error appears in the above-identified patent and that said Letters Patent are hereby corrected as shown below:

Column 1, line 63, the word "porduced" should be --produced--.

Column 2, line 24, "2-fluoorphenyl," should be --2-fluorophenyl,--

Column 2, line 36, "4-ethoxyphenyl-" should be --4-ethoxyphenyl,--

Column 3, line 7. after "to" insert the following:
-- about twenty-four hours --.

Column 3, line 8, delete the word "such"; substitute therefor --the--; same line 8, cancel "about 85-115° C., with agitation."

Column 3, line 9, before the word "longer" insert the following: --for periods--.

Column 5, line 56, "7,14-dhphenyl," should be --7,14-diphenyl--.

Column 6, line 4, in the formula, that portion reading "naphthrydine-6.13-dione" should be -- -naphthrydine-6,13-dione--.

Column 7, line 55, "(33.4%" should read --(22.4%--.

Column 8, claim 4, 2nd line, the word "phenyl", first occurrence, should read -- phenylene --.

Signed and sealed this 6th day of June 1972.

(SEAL)
Attest:

EDWARD M. FLETCHER, JR.
Attesting Officer

ROBERT GOTTSCHALK
Commissioner of Patents